Feb. 7, 1956   R. G. LE TOURNEAU   2,733,770
VEHICLE BODY INDUCTIVELY HEATED BY DYNAMIC BRAKING
Filed Jan. 25, 1950   3 Sheets-Sheet 2
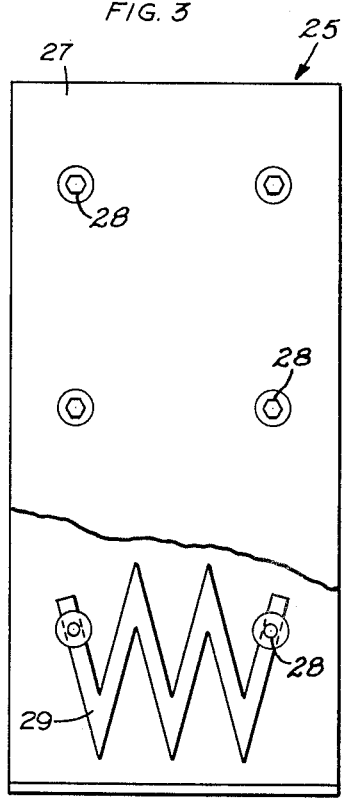
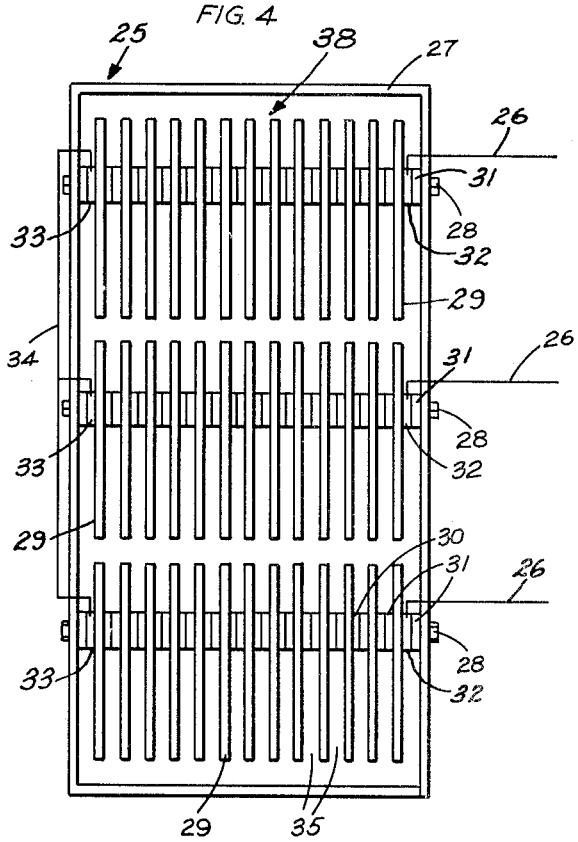
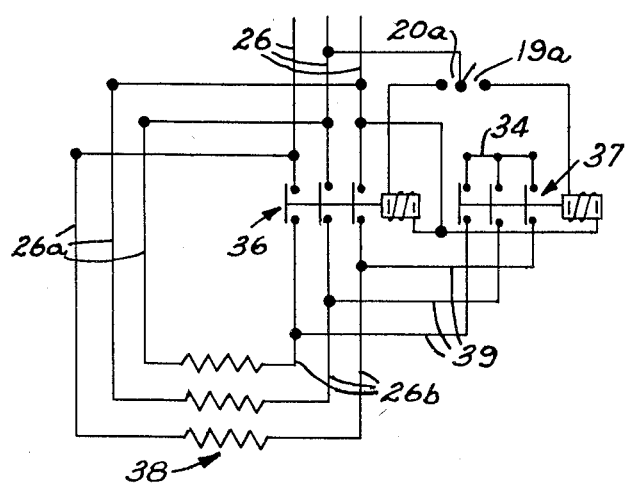
FIG. 5
INVENTOR.
R. G. LeTOURNEAU
BY
J. D. Copeland Jr.
AGENT Feb. 7, 1956 R. G. LE TOURNEAU 2,733,770
VEHICLE BODY INDUCTIVELY HEATED BY DYNAMIC BRAKING
Filed Jan. 25, 1950 3 Sheets-Sheet 3
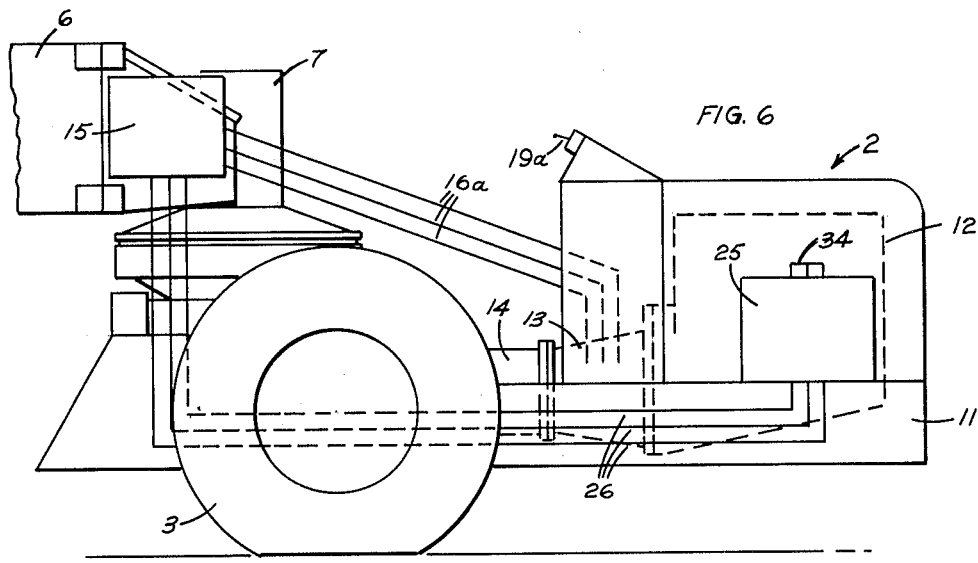
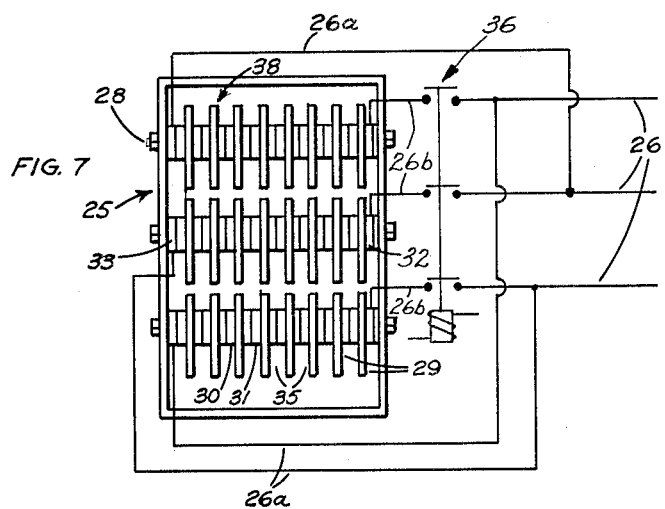
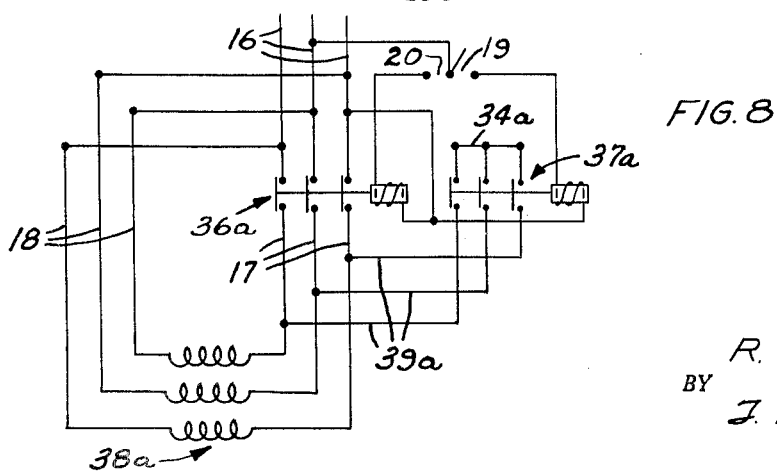
INVENTOR.
R. G. LeTOURNEAU
BY
J. D. Copeland Jr.
AGENT

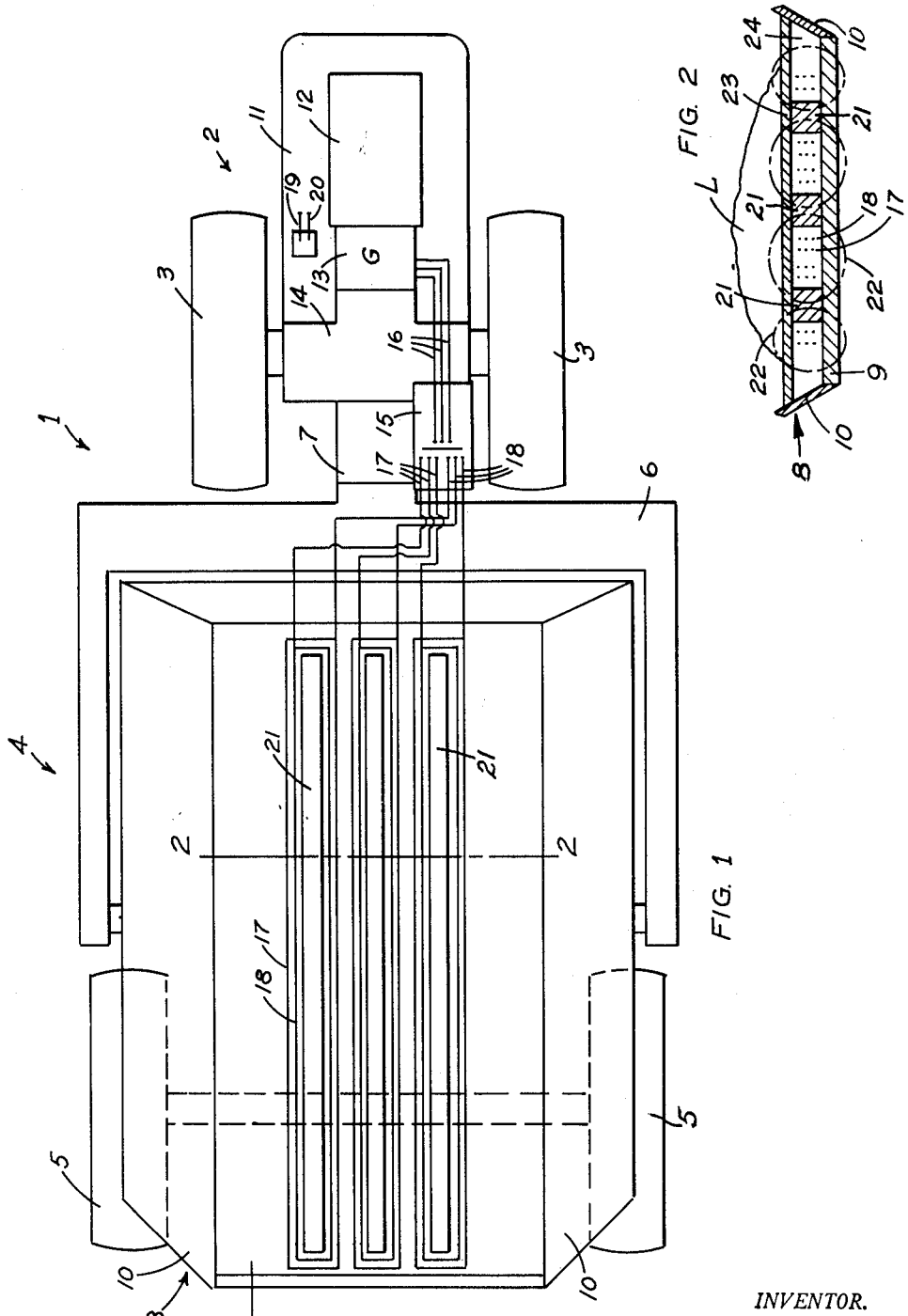

United States Patent Office 2,733,770
Patented Feb. 7, 1956

2,733,770

VEHICLE BODY INDUCTIVELY HEATED BY DYNAMIC BRAKING

Robert G. Le Tourneau, Longview, Tex., assignor to R. G. Le Tourneau, Inc., Peoria, Ill., a corporation of California Application January 25, 1950, Serial No. 140,524

6 Claims. (Cl. 180—1)

This invention relates to heavy duty construction vehicles and more particularly to such a vehicle which includes an engine driven generator for supplying electric power for operating functional units of the vehicle.

The primary object of this invention is to provide a system of braking for vehicles which is independent of the wheel brakes.

A second object is to provide an improved braking system which is frictionless and which requires no physical effort on the part of the operator.

An additional object is to provide a unit for heating the dump body by induction, so that the body itself is the source of heat which will prevent the load carried in the body from freezing immediately adjacent the body and adhering thereto.

A further object is to utilize current from the engine driven generator to supply the heat by induction to the dump body, which will when desired drain such a large quantiy of current from the engine driven generator that the engine is slowed down thereby to aid in braking the vehicle's speed.

Another object is to provide a unique resistance unit which may be used alternatively in place of the heating system to provide the braking means.

Another object is to provide a vehicle with current carrying coils in the body performing the dual function of dynamically braking the vehicle and heating the body.

Another object is to provide a dynamic braking system for a material hauling vehicle.

Yet another object is to provide a two stage control for both the resistance unit and the heating system whereby the braking action may be moderate or great as required under the circumstances.

Other objects and advantages will become apparent from a perusal of the following specification and the accompanying drawings, in which:

Fig. 1 is a schematic showing the complete dump wagon and that part of the electrical system involved in this invention. The cover plate has been removed from the heating unit to show the placement of the windings.

Fig. 2 is a fragmentary section taken along the lines 2—2 of Fig. 1 showing the detail of the bottom plate and method of installing the heating windings.

Fig. 3 is a side elevation of a modified embodiment of this invention.

Fig. 4 is a plan view of the resistance unit shown in Fig. 3.

Fig. 5 is a wiring diagram showing the two control circuits used with the resistance unit of Fig. 4.

Fig. 6 represents the resistor unit embodiment of this invention installed on the two wheel tractor of Fig. 1.

Fig. 7 represents a detail view of the resistor unit of Fig. 4 but employing a different circuit.

Fig. 8 is a wiring diagram showing the two control circuits used with the resistance units of Figs. 1 and 2.

In a heavy duty hauling vehicle such as the one described in this specification, it is very desirable to provide a method of braking independent of the wheel brakes and one that is more effective than by letting the engine alone retard the forward speed. The invention at hand utilizes an electric generator which is already present to provide power for the electrically controlled dump gates and steering unit to accomplish this desired feature of additional braking. It is well known that loading down an engine driven generator by drawing off sufficient current can even stall the engine if desired. This fact has been utilized to provide the desired braking, and in addition the current drain is utilized in one embodiment to heat the dump body so that a load of dirt carried in the body will not freeze and be difficult to discharge. Cold metal has a remarkable affinity for any material such as earth that is placed against it, and the method employed heats not only the load but the body walls as well so there is no tendency for the dirt to stick to the walls. This embodiment includes two controls, the first for heating only as when operating in cold climates but with a level terrain, and the second for both heating and braking, and this latter would be employed in a country where the climate may be cold and many steep downgrades are encountered. Another embodiment, shown in Figs. 3 and 4, is used for braking only and the heat generated therein is dissipated into the surrounding air.

Referring now to the drawing, in Fig. 1 the vehicle on which this invention is installed is seen to be a dump wagon, indicated generally at 1, which consists of a two wheel tractor 2, including drive wheels 3, and a rear end dump trailer 4, including the rear wheels 5 and a yoke 6 for attaching the trailer 4 to the tractor thru the medium of an electric steering hitch 7. Trailer 4 contains as its main structure a dump body 8. The bottom of the dump body 8 may be seen in Fig. 2 to be in the form of a honeycomb made up of current carrying members including a bottom plate 9, side walls 10, cores 21 and a cover plate 23.

Tractor 2 includes a frame 11 on which is mounted a prime mover in the form of an internal combustion engine 12 and to which engine a generator 13 or G is directly attached. This direct attachment of the generator to the main drive shaft of the engine is beneficial in that the retarding action of the generator due to its load will be transmitted directly to the engine and there is no loss of the retarding force as there might be due to belt slippage in a belt drive generator. Beyond the generator 13, the power is transmitted thru a transmission and final drive unit represented as 14 to drive wheels 3.

Adjacent steering hitch 7, a master switch box 15 is located and this box provides the necessary relays to direct the current from leads 16 of the three phase A. C. generator 13 to the various functional motors (not shown) such as steering, body hoisting, etc. of this vehicle, and also to engage either of the induction windings 17 or 18 in response to selector switch 19 or 20 in the operator's cockpit.

Windings 17 have the greatest number of turns and therefore have less drain on generator 13. Their function is primarily heating the body 8 by induction. Windings 18 have a smaller number of turns and they will consequently place a larger drain on the generator, so that the generator will under this load retard the speed of engine 12 and thereby become an effective braking means for the forward speed of the vehicle. Both induction windings 17 and 18 are wound about a common core 21 for each phase. When either or both windings are energized, flux 22 is created which in turn induces heat in core 21, bottom plate 9, and a cover plate 23 which overlays the cores and acts as a false bottom to enclose a space 24 and also protect the windings. A load shown partially at L rests upon this plate while being transported in body 8. It will be noted in Fig. 2 that a large portion of the heat induced in core 21 will indirectly heat plate 23 or air space 24, and this space will insulate plate 23 from the cold air underneath plate 9. The load L adjacent plate 23 will receive heat from the plate and core. Both windings are asbestos covered to prevent their being damaged by the surrounding heat.

In another embodiment of this invention, as may be observed in Fig. 6 a resistor unit 25 is installed on frame 11 and connected by leads 26 to switch box 15 which itself receives power thru leads 16a from generator 13. The switches 19a and 20a are adapted to energize resistor unit 25, and when so engaged this unit will effect a drain on generator 13 in a similar manner to windings 17 and 18. Assuming 19a would be the switch employed to energize the first stage of the resistor unit 25, as shown in Figs. 4 and 5, it would necessarily close switch 37 and thereby throw in the "star circuit" as will presently be described. Switch 20a would therefore be employed to throw in the "delta circuit" by closing switch 36 only, and this embodiment is shown in Fig. 7 and also described subsequently with reference to Fig. 5.

Details of unit 25 may be observed in Figs. 3 and 4. The complete unit includes a box-shaped housing 27 with open sides, and six non-conducting bolts 28 onto which three rows of W-shaped grids 29 are stacked. The grids 29 are spaced from each other on bolts 28 by either a pair of steel washers 30 or one steel and one mica washer 31. By this arrangement, current is caused to flow thru each grid in its circuit from terminals 32 for leads 26 to terminal 33 for star connector lead 34 (in this stage). The use of the washers 30 and 31, in addition to thus directing the current, also provides an air space 35 between the plates for cooling purposes.

The unit 25 of Fig. 4, just described, represents one stage of the two stage retarding system of this embodiment. When it is desired to utilize two stages of current drain and therefore two stages of retarding, a unique wiring circuit as shown in Fig. 5 is employed. This permits the same physical unit to be employed to furnish two different resistance values by simply arranging the switches and wiring. These two arrangements are seen to be a "star" and "delta" connection. In the "star" circuit, switch 36 will remain open and switch 37 engaged so that the current from leads 26 will take the circuit thru leads 26a and resistances 38 and from there thru leads 26b and then thru leads 39 tapped from leads 26b and on to switch 37 which is closed so that star connector 34 completes the circuit. When the "delta" circuit is used, switch 37 remains open and switch 36 is engaged so that current from leads 26 may complete a circuit including leads 26a, resistances 38 and leads 26b, which contains less resistance than the "star" circuit. Since the "star" contains the most resistance, the least current will flow when it is used, and therefore the least retarding or braking action on the engine will result.

The "delta" circuit as shown in Figs. 4 and 7 on the other hand will provide the maximum braking and these two circuits may be controlled from the same switches 19a and 20a in the operator's cockpit that formerly controlled windings 17 and 18 of the induction heating system.

The two circuits just described may be adapted as well to the heating unit of this invention if such a circuit is preferable over either two separate windings or one winding with two tapped leads (to provide two different numbers of turns). Fig. 8 shows a wiring diagram employed to utilize coils 17 and 18 in a two stage unit similar to resistance unit 25 as shown in Fig. 5. This circuit could be employed with either coil 17 or coil 18 but in this diagram the coils are connected so as to make a continuous resistance element identified as 38a. Referring to Figs. 1 and 8, current from the generator 13 is directed into switch box 15 by leads 16 and if switch 37a is closed, the first stage or "star" circuit will be thrown in and the current flow will be thru leads 18, elements 38a, and thru leads 17 and 39a to star connector 34a. If switch 36a is closed, and 37a remains open, the second stage will be utilized and a "delta" circuit will be formed thru leads 16, 17, elements 38a, and thru leads 18 to leads 16.

Thus it may readily be seen that the inductance coils 17 and 18 when energized perform the desirable dual function of providing dynamic braking for the wheels and inductively heating the vehicle body.

From the foregoing description, it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention, the following is claimed as new and useful, and upon which Letters Patent is desired:

1. In a vehicle including an engine and a body, drive wheels supporting the vehicle and powered by the engine, an in-line generator directly attached to said engine and driven thereby; an electric heating system for heating said body, first means connected to said generator and supplying current to said system at a relatively low rate to supply heat to the body without noticeably retarding the engine speed, other means connected to said generator and supplying current to said system at a relatively high rate to both heat said body and to retard the engine speed, and switching means connecting said generator and said first and other means effective to alternatively render either one of the two last-mentioned means effective.

2. In a vehicle including an internal combustion engine and a body, drive wheels supporting the vehicle and powered by the engine, an in-line generator attached directly to said engine and driven thereby, an induction heating system inductively related to said body for heating the same, first means connected to said generator and supplying current to said system at a relatively low rate to supply heat to the body without noticeably retarding the engine speed, other means connected to said generator and supplying current to said system at a relatively high rate to both heat said body and to retard the engine speed, and switching means connecting said generator and said first and other means effective to alternatively render either one of the two last-mentioned means effective.

3. In a vehicle including an engine, an alternating current generator coupled to said engine, said vehicle having a loading floor, a resistance unit, means mounting said resistance unit in heat conducting and magnetic relationship to said loading floor whereby varying currents in said resistance unit cause currents to flow in said floor to heat the same, means connecting said generator to said resistance unit, said generator comprising a multi-phase alternating current generator, said resistance unit including a plurality of resistance elements each corresponding respectively to a phase of the multi-phase generator, said connecting means comprising switchable means for alternatively connecting said resistance elements either in a star connection or in a delta connection, whereby when said resistance elements are connected in a star connection, current is supplied thereto by the generator to heat the body without noticeably retarding the engine speed, and when said resistance elements are connected in a delta connection, current is supplied thereto by the generator to both heat the body and retard the engine speed.

4. In a wheeled vehicle, the combination of: a vehicle body, said vehicle having wheels, an engine driving said wheels, an alternating current generator coupled to said engine, said body being in the form of a honeycomb and comprising a bottom plate, side walls, a plurality of cores fixed in spaced relation on the bottom plate, a cover plate secured to the side walls and to the cores in spaced relation from the bottom plate, current carrying coils surrounding the cores, the plates, side walls and cores being capable of carrying electric current, said alternating current generator being connected to said coils whereby the resulting current flows through said coils and induces electrical heating current in said body and the generator is thereby slowed down to produce a braking action.

5. In a vehicle including an engine and a body, drive wheels supporting the vehicle and powered by the engine, a generator directly attached to said engine and driven thereby; an electric heating system for heating said body, first means connected to said generator and supplying current to said system at a relatively low rate to supply heat to the body without noticeably retarding the engine speed, other means connected to said generator and supplying current to said system at a relatively high rate to both heat said body and to retard the engine speed, and switching means connecting said generator and said first and other means effective to alternatively render either one of the two last-mentioned means effective.

6. In a vehicle including an internal combustion engine and a body, drive wheels supporting the vehicle and powered by the engine, a generator attached directly to said engine and driven thereby, an induction heating system inductively related to said body for heating the same, first means connected to said generator and supplying current to said system at a relatively low rate to supply heat to the body without noticeably retarding the engine speed, other means connected to said generator and supplying current to said system at a relatively high rate to both heat said body and to retard the engine speed, and switching means connecting said generator and said first and other means effective to alternatively render either one of the two last-mentioned means effective.

References Cited in the file of this patent

UNITED STATES PATENTS

| Number | Name | Date |
|---|---|---|
| 1,007,480 | North et al. | Oct. 31, 1911 |
| 1,069,661 | Carman | Aug. 5, 1913 |
| 1,194,165 | Fry | Aug. 8, 1916 |
| 1,447,781 | Standerwick | Dec. 18, 1923 |
| 1,477,782 | Steinmetz et al. | Dec. 18, 1923 |
| 1,638,857 | Keene | Aug. 16, 1927 |
| 1,677,633 | Harrison | July 17, 1928 |
| 1,783,142 | Sayres et al. | Nov. 25, 1930 |
| 1,788,107 | Hynes | Jan. 6, 1931 |
| 1,814,635 | Schlundt | July 14, 1931 |
| 1,942,207 | Ferwerda | Jan. 2, 1934 |
| 1,993,521 | Parsons | Mar. 5, 1935 |
| 2,015,556 | Fountain | Sept. 24, 1935 |
| 2,090,692 | Melton | Aug. 24, 1937 |
| 2,193,893 | Van Vleck | Mar. 19, 1940 |
| 2,215,296 | Ogden | Sept. 17, 1940 |
| 2,244,063 | Hobart | June 3, 1941 |
| 2,274,646 | Austin | Mar. 3, 1942 |
| 2,336,052 | Anderson et al. | Dec. 7, 1943 |
| 2,359,886 | Wikkenhauser | Oct. 10, 1944 |
| 2,400,868 | LeTourneau | May 28, 1946 |
| 2,454,070 | LeTourneau | Nov. 16, 1948 |
| 2,472,450 | Van Vleck | June 7, 1949 |
| 2,491,193 | Matthews | Dec. 13, 1949 |
| 2,501,401 | McCurtain | Mar. 21, 1950 |
| 2,506,809 | Nims | May 9, 1950 |
| 2,565,038 | McCurtain | Aug. 31, 1951 |

OTHER REFERENCES

Publication: title "Guy Six-Wheeled Trolleybus," pages 131—136 of "Automobile Engineer," April 1944 (Copy in Div. 47 in 180–65.)